Feb. 17, 1925.
M. LEEBOLD
VINE CUTTER ATTACHMENT FOR CULTIVATORS AND PLOWS
Filed Feb. 25, 1924    2 Sheets-Sheet 1
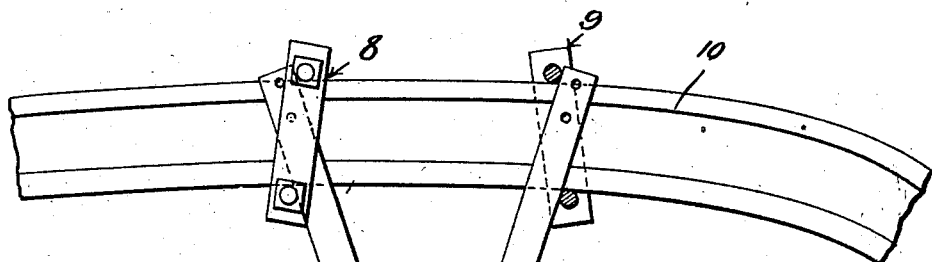
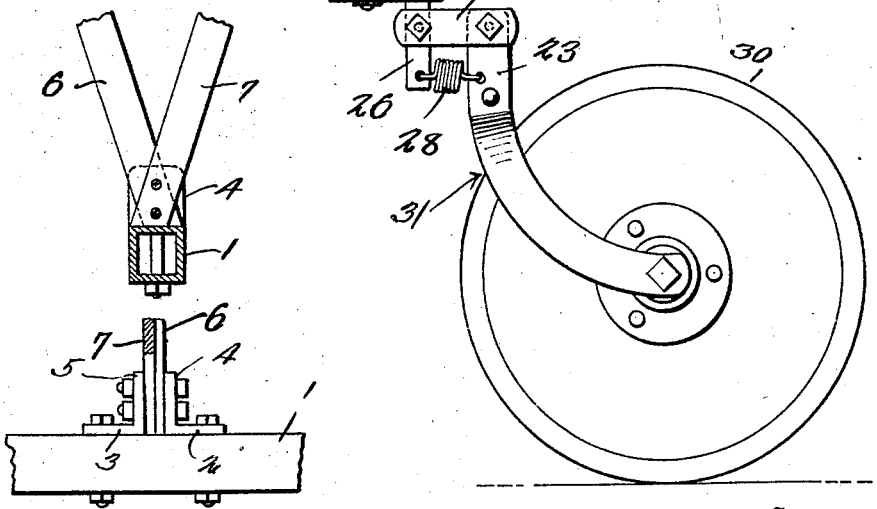
Inventor
M. Leebold

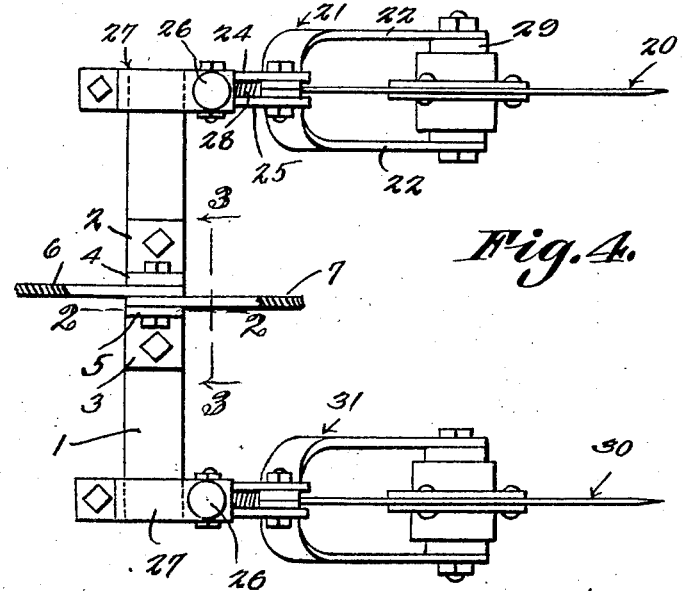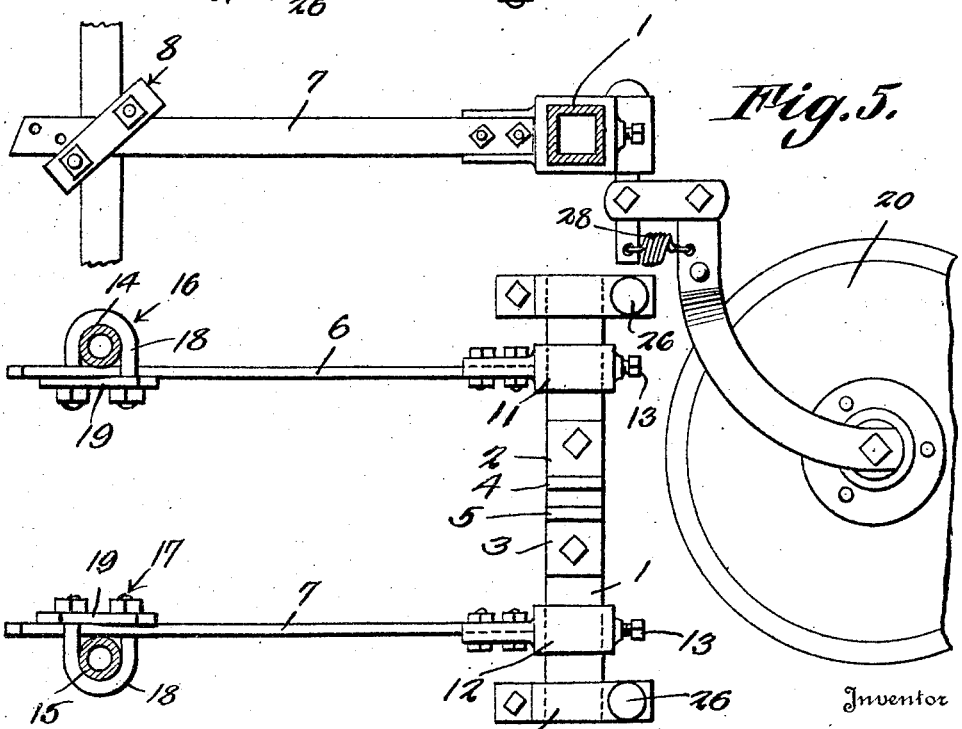

Patented Feb. 17, 1925.

1,526,639

UNITED STATES PATENT OFFICE.

MARTIN LEEBOLD, OF ST. LOUIS, MISSOURI.

VINE-CUTTER ATTACHMENT FOR CULTIVATORS AND PLOWS.

Application filed February 25, 1924. Serial No. 695,082.

*To all whom it may concern:*

Be it known that I, MARTIN LEEBOLD, a citizen of the United States, residing at St. Louis, State of Missouri, have invented a new and useful Vine-Cutter Attachment for Cultivators and Plows. of which the following is a specification.

This invention relates to agricultural implements and more particularly to vine cutter attachments for plows, cultivators, and the like.

The object of the invention is to provide an attachment of this character so constructed that the cutters will follow the shovels in a straight line when the latter are shifted sideways and thereby prevent the attachment from springing out of place or breaking, and which may be attached to any and all makes of shovel cultivators as well as to any make of surface cultivator.

Another object is to provide pairs of cutters so mounted that they will have a certain amount of yieldability to permit them to ride individually over obstructions thereby preventing them both being out of service at the same time, so that no vines will be missed.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings:

Figure 1 represents a side elevation of the attachment constituting this invention shown applied.

Fig. 2 is a detail cross sectional view taken on the line 2—2 of Fig. 4.

Fig. 3 is a detail taken on the line 3—3 of Fig. 4.

Fig. 4 is a plan view of the attachment detached, the connecting or draw bars being in section.

Fig. 5 is a side elevation showing a slightly different form of the invention the head bar being in transverse section; and Fig. 6 is a plan view, with the standards on which the attachment is mounted shown in section.

In the embodiment illustrated in Figs. 1 to 4 a hollow head bar 1 has mounted on the ends thereof disk-shaped cutters 20 and 30. These cutters are carried by forked standards 21 and 31, which are exactly alike and hence one only will be described in detail. The furcations 22 of standard 21 are curved longitudinally edgewise as shown clearly in Fig. 1 and the shank 23 thereof is pivotally mounted between two links 24 and 25. These links straddle a heavy connecting pin 26 carried by a clamp 27 which is adjustably mounted on the head bar 1. The pin 26 projects below the links 24 and 25 and its lower end is connected by a heavy coiled spring 28 with the shank 23 of the cutter fork as is shown clearly in Fig. 1.

The cutter 20 is rotatably mounted on a spindle 29 supported in the ends of the furcations 22 of the fork 21 and is secured by any suitable means.

Two L-shaped brackets 2 and 3 are bolted on the upper face of head bar 1 the upstandings arms 4 and 5 thereof being spaced laterally to receive between them two connecting bars 6 and 7 which are arranged in lapping relation as shown clearly in Figs. 2 and 4 and secured by bolts passing through the arms 4 and 5 of the brackets and through the ends of the connecting bars. These bar ends are beveled as shown clearly in Fig. 2 and are arranged to abut the upper face of the head bar 1 their upper diverging ends being secured to the cultivator beam 10 by clamps 8 and 9. These clamps straddle the beam 10 and have the bars 6 and 7 clamped between them and said beam as is shown clearly in Fig. 1. This arrangement fixedly secures the attachment without danger of its slipping.

In the form shown in Figs. 5 and 6 the connecting bars 6 and 7 have hollow heads 11 and 12 bolted to one end thereof said heads being slidable on the head bar 1 and held in adjusted position thereon by set screws or bolts 13. This form of connection is designed to be used when the vine cutter is to be attached to a shovel cultivator and when so used the bars 6 and 7 are removed from the brackets 2 and 3 and their ends reversed, the beveled ends which were connected with the brackets being secured to the cultivator standards 14 and 15 by clamps 16 and 17 here shown in the form of U-bolts 18 which straddle the bars 6 and 7 and the standards of the cultivator and are equipped with clamping plates 19 secured by nuts in the usual manner.

The heads 11 and 12 are removably mounted on the bars 6 and 7 so that when the attachment is to be applied to a surface plow the heads are removed and the bars secured as shown in Fig. 1.

From the above description it will be obvious that the attachment herein shown is secured to the standards or beam of the implement by clamps so that no holes are drilled in said implements avoiding weakening thereof. Moreover by employing two rotary cutters and mounting them by forks on the heavy head bar pins 26 the cutters are permitted to swing laterally and hence will follow the shovels when shifted sideways and thus prevent breaking and springing of the cutters and their connections. The connection of the cutter standards with the pins 26 by the coiled springs 28 permit either one of the cutters to be lifted out of the ground during their passage over an obstruction the other cutter remaining in service so that no vines are missed during the cutting operation preventing congestion of the vines on the shovels.

It is of course understood that these cutters are mounted in front of the cultivator or plow shovels so as to cut the vines in advance of said shovels and prevent them from entangling on the shovel shanks.

I claim:—

1. The combination with a plow or cultivator having a shovel; of a vine cutter including a head bar, a cutting disk carried by said bar, and draw bars for connecting said head bar to an implement, and means carried by said head bar for connecting the opposite ends of the draw bars therewith to adapt said bars for use in upright or horizontal position to connect the disk to a plow beam or to a cultivator standard.

2. An attachment of the class described comprising a head bar, cutters mounted for vertical and horizontal movement thereon, brackets carried by said bar, and draw bars secured to said brackets and diverging toward their upper ends, and means for connecting said draw bars to an implement.

In testimony that I claim the foregoing as my own, I have hereto affixed my signature in the presence of two witnesses.

MARTIN LEEBOLD.

Witnesses:
THEODORE F. KOLB,
M. H. DABREY.